United States Patent [19]

Roth

[11] 4,322,224

[45] Mar. 30, 1982

[54] SPRAY ABSORBER CONTROL SYSTEM AND METHOD

[75] Inventor: Alfred H. Roth, Annville, Pa.

[73] Assignee: General Electric Co., Lebanon, Pa.

[21] Appl. No.: 202,175

[22] Filed: Oct. 29, 1980

[51] Int. Cl.$^3$ .............................................. B01D 47/06
[52] U.S. Cl. ........................................ 55/20; 55/73;
55/226; 55/DIG. 34; 422/62; 422/111;
422/117; 422/168; 423/244
[58] Field of Search ........................ 55/18, 20, 73, 126,
55/225-227, DIG. 34; 422/62, 105, 109-111,
117, 120, 168, 169; 423/210, 212 C, 242 A, 244 A

[56] References Cited

U.S. PATENT DOCUMENTS

| | | | |
|---|---|---|---|
| 2,895,800 | 7/1959 | Otto | 422/168 X |
| 3,649,205 | 3/1972 | Shirakawa et al. | 422/62 |
| 3,656,911 | 4/1972 | Hobbs | 422/62 |
| 3,695,004 | 10/1972 | DeLisio et al. | 55/226 X |
| 3,880,629 | 4/1975 | Dulin et al. | 423/244 X |
| 3,932,587 | 1/1976 | Grantham et al. | 423/242 |
| 3,989,465 | 11/1976 | Onnen | 422/110 |
| 4,164,547 | 8/1979 | Simko | 422/111 X |
| 4,197,278 | 4/1980 | Gebri et al. | 423/242 |
| 4,208,383 | 6/1980 | Kisters et al. | 422/111 X |

OTHER PUBLICATIONS

Parsons, Jr., Disclosure Document on Spray Absorber-Two Loop Sorbent Feed Control System, seven pages, 1/10/1980.
Chemical Engineers' Handbook, 5th edition, pp. 22-4, 5 & 6, (1973).
Proctor-Spray and Dispersion Drying Systems, (1969).
Steam/Its Generation and Use, pp. 35-1 to 35-24, (1972).
Process Instruments and Controls Handbook, pp. 18-49, 50, 51, 64, 65 & 66, (1974).
Power, Jan. 1979: Spray-Dryer System Scrubs $SO_2$, (Midkiff), pp. 29-32.
Hurst, Dry Scrubbing Eliminates Wet Sludge, (Oct. 7-11, 1979).

Primary Examiner—Robert H. Spitzer
Attorney, Agent, or Firm—Philip L. Schlamp

[57] ABSTRACT

A control system and method for a spray absorber desulphurization system including a $SO_2$ feedback control loop, a temperature feedback control loop, partial and complete shutdown controls having feed forward sensors.

11 Claims, 1 Drawing Figure

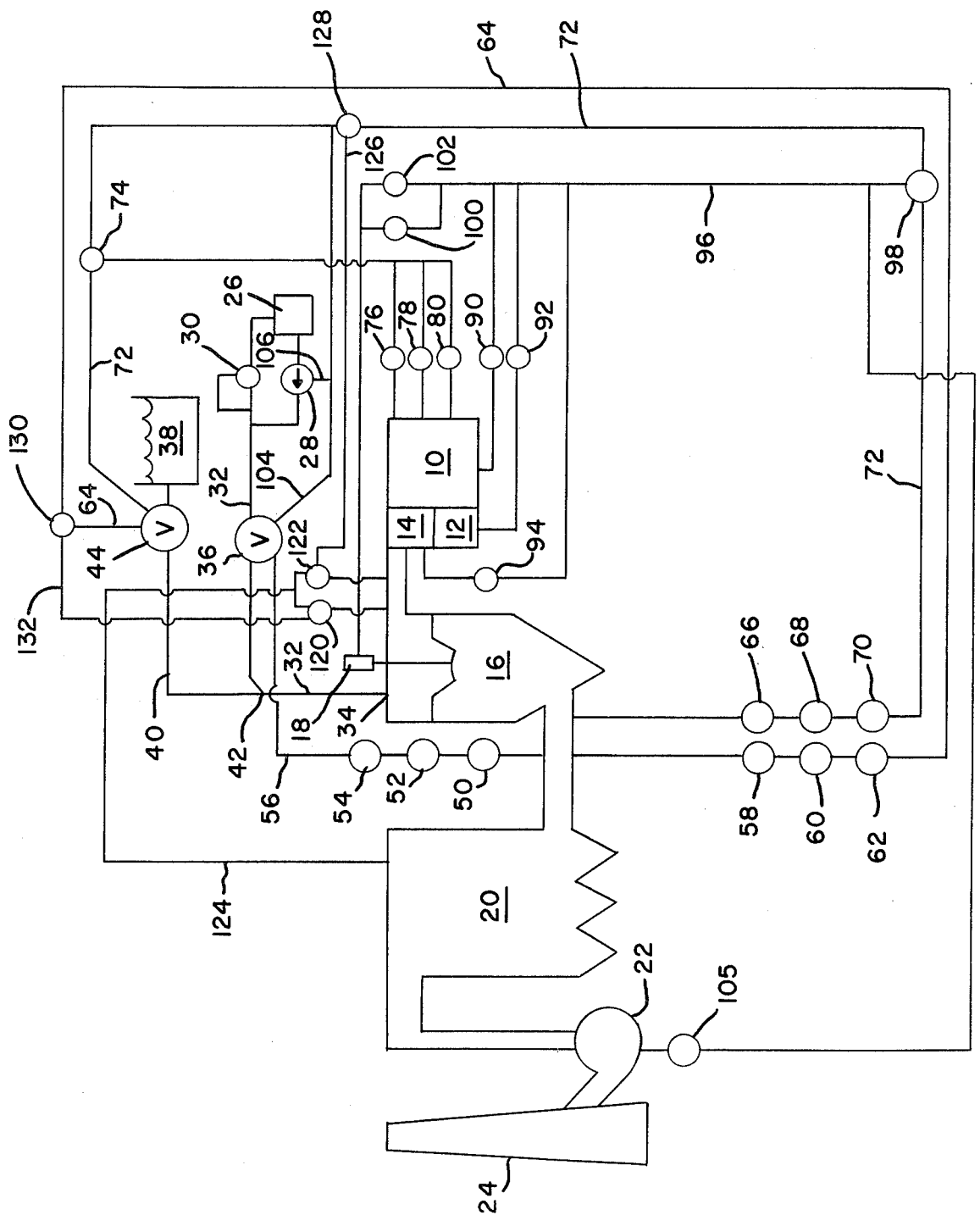

SPRAY ABSORBER CONTROL SYSTEM AND METHOD

The invention relates to the improved control system and method for use in a spray absorber of the type used in removing contaminants from a gaseous stream. These types of systems and controls typically desulphurize the boiler flue gas of electric-power generation plants fired by fossil fuels.

In the spray absorption process, an aqueous sorbent solution or slurry is sprayed into a flue gas stream as the stream passes through an absorber to chemically capture contaminants present in the gas. Within the absorber the contaminants are reduced to suspended dry particles. The particles are removed from the gas stream by a downstream filter.

Successful operation of the absorber system requires control of the process to prevent condensation in or downstream from the absorber. Such condensation agglomerates the otherwise dry particles and corrodes and clogs the downstream ductwork, filter, induced draft fan and stack. The risk of downstream condensation is always present because water is injected into the absorber to create the proper environment for desulphurization. Theoretically, desulphurization occurs most efficiently when the humid atmosphere within the atomizer is at the dewpoint. Practical considerations make it impossible to maintain dewpoint temperature in the atomizer without downstream condensation. For this reason, the amount of water flowed to the atomizer is conventionally controlled to maintain the atomizer temperature above dewpoint by an amount commonly called the approach temperature. In order to prevent condensation in the components downstream of the absorber, the approach temperature is carefully controlled to prevent an approach anywhere within the system, which would result in condensation. Conventional temperature and $SO_2$ feedback loops control the flow of sorbent slurry and dilution water to the absorber in response to the $SO_2$ concentration downstream from the absorber and the temperature of the flue gas leaving the absorber.

Conventional controls also shut down the flow of all water to the absorber in the event the absorber exit temperature exceeds a set value. With use of this type of control, upsets or failures in the boiler or absorption system could result in condensation downstream of the absorber.

The improved control and method supplements a conventional control as described. It positively monitors elements or conditions subject to failure or upset and in response to failure biases the absorber toward a high exit temperature, thereby maintaining an approach temperature and avoiding condensation. The upset or failure may require partial or complete shutdown of the absorber. In order to prevent damage to filter elements, the filter may have to be shifted to a bypass mode. The bias of the control system is achieved through a partial shutdown control, a complete shutdown control and a filter control. The partial shutdown control partially deactivates the absorber by shutting off the flow of dilution water. This elevates the reaction temperature and reduces the efficiency of the absorption process. Partial shutdown is initiated by feed forward sensors actuated in response to calculated excess moisture in the gas flow. Actuation of the feed forward sensors enables the absorber to respond to conditions which would cause lower approach temperatures by the time the humid flue gas reaches the absorber.

The complete shutdown control cuts off both dilution water and sorbent slurry in response to a major failure or upset. The control also includes a number or sensors monitoring the performance of mechanical components.

The filter control is intended to operate during startup and shutdown to bypass the filter elements and limit the amount of water supplied to the absorber. This control includes a feed forward sensor which monitors the boiler to detect a sudden high increase in flue gas temperature and in response reduces or shuts off the flow of water to the absorber to avoid excess water injection and condensation resulting from passage of the leading wave of hot humid gas through the relatively cooler downstream components.

The control system automatically assures that upon failure or upset the absorber system is maintained in operation, although in some cases with decreased efficiency, for as long as possible without the formation of condensation. The absorber system is completely shut down in response to upsets or failures sufficiently severe that continued operation would risk condenstion formation. The damper control prevents condensation in the filter elements during startup and shutdown and through the system in response to high temperature flue gas. Automatic operation of the control enables plant operators to ignore the absorption system and concentrate on the main plant during major plant failures such as a boiler trip or tube rupture.

Other objects and features of the invention will become apparent as the description proceeds, especially when taken in conjunction with the accompanying drawing illustrating the invention, of which there is one sheet and one embodiment.

The drawing is a schematic representation of a burner and dry scrubbing flue gas desulfurization system and a control system for the desulfurization system.

As illustrated in the drawing, boiler 10 includes a forced draft fan 12 and an air preheater 14 which extracts energy from the burner exhaust gas to preheat the combustion air supplied by fan 12. The exhaust gas flow from the preheater to a dry $SO_2$ spray absorber 16 which includes a rotary atomizer driven by atomizer drive motor 18. The outlet from the spary absorber 16 is connected to the inlet of a filter unit 20, commonly referred to as a baghouse. The filter 20 includes suitable filtering elements for removing solids from the flow received from the absorber, together with a filter bypass and dampers for directing the flow through either the filter elements or the bypass. The outlet of the filter is connected to the inlet of induced draft fan 22 which discharges out stack 24.

The exhaust gases flowing through absorber 16 are desulphurized by a chemical reaction with a fine spray of sorbent particles generated by the atomizer. The supply system includes a conventional slaker (not illustrated) for forming a sorbent slurry which is flowed to slurry tank 26. A sorbent pump 28 flows the sorbent slurry around a recirculation loop extending from the tank, past the pump and pressure regulator 30 and back to the tank. Slurry flow line 32 extends from the recirculation loop between the pump 28 and pressure regulator 30 past slurry control valve 36 to a slurry inlet 34 on the top of absorber 16. Slurry control valve 36 opens or closes passage 32 proportionally to a variable input signal and includes provision for automatically closing passage 32 upon receipt of a second signal.

Dilution water proportional to an input signal is supplied to the sorbent slurry flowing through line 32. The water flows from reservoir 38 along line 40 to a mixing junction 42 where line 40 meets line 32 and the slurry carried by line 32 and the dilution water carried by line 40 are mixed prior to discharge into the absorber. Throttling valve 44 is provided in line 40 and operates similarly to valve 36 to control the flow through line 40 proportionally in response to an input signal. The valve also automatically closes in response to receipt of a second signal.

During operation of the boiler and desulfurizaton system, the flow of sorbent slurry and dilution water to the absorber 16 is automatically varied to compensate for changes in the $SO_2$ concentration and temperature of the gas discharged from the absorber. With increased $SO_2$ concentration, a first control loop automatically opens valve 36 proportionally to increase the flow of sorbent into the absorber. Increased temperature of the discharged gas activates a second control loop to increase the flow of dilution water to the absorber. The control loops likewise decrease the amount of sorbent and dilution water supplied to the absorber in response to decreased $SO_2$ concentration and decreased gas temperature.

The first control loop includes an $SO_2$ sensor 50 extending into the ductwork connecting the absorber and filter to sense the concentration of $SO_2$ in the discharge gas. The output of the sensor is connected to a transmitter 52 which generates an output signal proportional to the sensed $SO_2$ concentration. This signal is transmitted to a proportional controller 54 having an outfit transmitted to valve 36 along line 56. The proportional controller 54 is set to maintain $SO_2$ concentration in the outlet gas stream at a preset level. If the sensed $SO_2$ concentration rises above the preset level, the controller proportionally opens the valve 36 to supply additional sorbent to the absorber and thereby reduce the $SO_2$ concentration. With reduced $SO_2$ concentration, the controller 54 proportionally closes valve 36 to reduce the sorbent flow. In this way, the flow of sorbent to the absorber is regulated as a function of the downstream $SO_2$ concentration. While sensor 50 is illustrated in the drawing as being located in the ductwork adjacent the absorber outlet, it may be located anywhere downstream of the absorber.

The second control loop for dilution water includes a temperature sensor 58 located in the ductwork between the absorber and the filter, a transmitter 60 and variable controller 62 connected so that the transmitter generates an output signal proportional to the temperature of the discharge gas and the controller generates an output signal carried by line 64 to open or close valve 44 proportionally to increase or decrease the temperature of the gas.

Sorbent is used most efficiently when the absorber exit temperature approaches the dewpoint of water. In order to avoid condensation in downstream components including ductwork, the fabric filter, fan and stack, the controller 62 opens and closes valve 44 to supply sufficient dilution water to the absorber 16 in a manner that the outlet temperature is maintained at a value greater than the dewpoint temperature. Since an increase in the amount of water in the absorber both reduces the gas temperature and increases the dewpoint, this temperature must be monitored carefully in order to prevent lowering of the gas temperature below the dewpoint with resultant condensation on downstream components. Controller 62 is adjusted to maintain the temperature of the exhaust gas downstream of the absorber at a level above the dewpoint. In the event temperature rises above the adjustment temperature valve 44 is proportionally opened to increase the flow of dilution water to the absorber and reduce the temperature. At the same time, the efficiency of the absorption process is increased as the temperature is lowered towards the dewpoint. Conversely, lowering of the discharge temperature below the set value generates a signal proportionately closing the valve 44 to reduce the flow of dilution water so that the temperature in the absorber increases to the operating value.

During normal operation of the boiler 10 and desulfurization system, the two $SO_2$ concentration and feedback control loops effectively meter the flow of sorbent and dilution water to the absorber to compensate for normal variations in composition and temperature of the boiler exhaust gas.

In addition to the two feedback loops previously described, the control shown in the drawing monitors the operation of the boiler and desulfurization system and partially or completely shuts down the desulfurization unit in response to failures in the operation of the system. Shutdown is controlled to avoid condensation in the absorber gas. Condensation damages most filter materials, corrodes metal surfaces and, in combination with fly ash and reaction product, forms an agglomeration which collects in and downstream of the absorber. An ash handling system used with the desulfurization unit would also be clogged by the agglomeration.

In the controlled shutdown, the temperature of the absorber discharge gas exceeds design temperature. This type of shutdown is produced by reducing or stopping the flow of water to the absorber. The upset control system operates to achieve high temperature failure shutdown of the absorber system while avoiding the water-condensation shutdown.

The absorber control system shuts the absorber down partially or completely, depending upon the severity of the failure or upset. Minor upstream upsets are sensed by feed forward sensors of a partial shutdown control. Actuation of these sensors shuts off the flow of dilution water to the absorber. The partial shutdown control includes sensors monitoring water input to the combustion gas upstream of the absorber. Major upsets actuate a sensor of a complete shutdown control to shut off the flow of both dilution water and sorbent slurry to the absorber. The complete shutdown control includes a high-temperature shutoff sensor for the gas leaving the absorber and sensors monitoring the performance of various critical elements of the boiler system. The absorber control system also includes a filter control operable to divert flue gas through the filter 20 without passing through the filter elements when the temperature of the flue gas flowing to the absorber exceeds or falls below the operating range of the absorber.

The complete shutdown control includes a temperature sensor 66, temperature transmitter 68 and controller 70. The sensor and transmitter 66 and 68 are similar to sensor and transmitter 58 and 60 and are provided to make the temperature control loop and complete shutdown control independent. Sensor 66 is mounted in the ductwork connecting the absorber to the filter. When the temperature of the gas is in the operating range for the absorber, the controller 70 generates a signal transmitted to valves 36 and 44 through lines 72 and 104. The signal holds the valves open and permits opening and closing movement of the valves in response to the signals generated by controllers 54 and 62.

The partial shutdown control includes a normally closed switch 74 located in line 72 between line 104 and valve 44, together with a number of feed forward sensors. When tripped, any of the sensors opens switch 74, breaks the signal from controller 70 to valve 44 and automatically shuts the valve to stop the flow of dilution water to the absorber. The feed forward sensors 76, 78 and 80 are connected to the boiler 10 and sense boiler failures insufficiently traumatic to require entire shutdown of the desulfurization system. For instance, sensor 76 is actuated in response to a rapid load reduction in the boiler which may decrease the gas flow sufficiently rapidly to be beyond the response time of the absorber system. The result would be a sluggish response in reducing the water flowing to the absorber, whether from the recirculation water or from the sorbent solution, and could create cooling of the absorber exit gas below the dewpoint.

Sensor 78 is connected to the boiler steamline system for actuation and opening of the switch 74 during soot blowing. The directly injected water used in soot blowing could reduce the temperature of the absorber discharge gas below the dewpoint and cause condensation.

Sensor 80 may be responsive to a boiler tube leak to open the switch 74 and shut off the flow of dilution water. This type of leak increases the water in the flue gas and may cause condensation.

Additional feed forward sensors similar to sensors 76, 78 and 80 may be provided to open switch 74 in response to other upstream humidity increases in the flue gas. For instance, switch 74 could be opened by a sensor responsive to increased moisture content in the fuel or to partial firing of the boiler on oil or gas resulting in increased moisture in the flue gas over that created by coal firing. A humidity or dewpoint sensor may be provided in the ductwork between the boiler and absorber in place of the specific feed forward sensors.

In addition to the temperature shutdown control 70, the complete shutdown control includes sensors which monitor upsets in the furnace and desulfurization system requiring immediate shutdown of the absorber. This control includes feed forward sensors 90, 92 and 94 connected to line 96 leading to normally closed switch 98 in line 72. Sensor 90 is connected to boiler 10 and is actuated in response of the main boiler trip or shutdown switch. Sensor 92 is connected to the forced draft fan 12 and is actuated by failure of the fan. Sensor 94 is connected to the air preheater 14 and is actuated upon failure of the preheater drive. Sensor 105 monitors fan 22 and is actuated by failure of the fan to open switch 98.

Parallel high and low current sensor 100 and 102 are connected to the atomizer drive motor 18 and are actuated, respectively, when the current flowing to the motor is above or below the normal operating range.

During normal operation, the temperature of the outlet gas absorber 16 is below the trigger setting of controller 70 and the controller signal transmitted by line 72 past normally closed switches 98 and 74 and by line 104 overcomes the internal bias of valves 36 and 44 toward the closed positions and permits the valves to be opened and closed in response to the signals from controllers 54 and 62.

Line 106 extends from line 104 to sorbent pump 28. Pump 28 is turned on in response to the signal from controller 70. So long as the signal is received by valves 36 and 44, the valves are free to control or meter the flow of sorbent slurry and dilution water to the absorber 16. Both valves are immediately closed and pump 28 is turned off in the event the temperature of gas leaving the absorber exceeds the trigger temperature of controller 70. Openings of switch 98 in response to actuation of any of sensors 90, 92, 94, 100, 102 and 105 also cuts off the signal from controller 70 to close both valves 36 and 44 and turn off the pump. In the event one of the sensors 76, 78 or 80 in the first subcontrol system has previously opened switch 74 to close the dilution water valve 44, tripping of controller 70 or opening of switch 98 will only close valve 36 and turn off the pump During startup, the absorber system is brought on-line only after the boiler and filter are on line and at operating temperature. During shutdown, the absorber system and filter must be taken off-line first in order to avoid the problems of condensation on cold walls and off-design operations at low absorber inlet temperatures and low gas flow rates.

The filter control automatically operates the filter bypass system in response to signals received from high-temperature sensor 120 and low-temperature sensor 122 located in the ductwork between the air preheater 14 and absorber 16. The output of these sensors is connected to the bypass controls in filter 20 by line 124. When during startup or shutdown the temperature of the flue gas downstream of the air preheater is below the minimum operating temperature for the absorber system, the dampers in the filter 20 bypass the gas without filtering in response to a signal from sensor 122.

The low-temperature sensor 122 is also connected by line 126 to controller 128 in line 72. Controller 128 may be a normally closed switch similar to switches 74 and 98. Sensor 122 holds switch 128 open until the gas flowing to the absorber reaches an operating temperature. By maintaining switch 128 open, valves 36 and 44 are held closed to prevent flow of the sorbent slurry and dilution water to the absorber until the flue gas has reached an operating temperature.

The air preheater 14 cools the flue gas and preheats the combustion air flowing to the boiler. Failure of the preheater results in a rapid increase in the temperature of the flue gas to perhaps a temperature as high as 700° F. Unless restrained, the temperature control loop will react to this temperature increase by providing maximum dilution of water flow in an attempt to reduce the outlet temperature of the gas. The reaction time of the temperature loop is too slow to respond to the initial temperature rise. Further, rapid dumping of water into the high-temperature wave front is undesirable because of the possibility of forming condensation when this moist front passes downstream through the cooler ductwork and filter. The high-temperature gas may injure the filter elements used to collect solids from the exhaust gas.

The feed forward filter control system reduces condensation and filter damage resulting from preheater failure. Upon preheater failure, feed forward sensor 120 is actuated by the initial high-temperature wave front and immediately initiates shifting of the filter dampers to bypass the filter elements and protect them from the high-temperature gas. At the same time, the sensor 120 actuates a controller 130 in line 64 by way of control line 132, to prevent valve 44 from fully opening until the filter bypass is completed. In some applications, the controller 130 may be connected to both valves 44 and 36 to close both valves in response to the signal from sensor 120 and thereby prevent the flow of any water to the absorber until bypass is completed. When bypass is completed, the sensor 120 is defeated and controller 130 is deactivated so that the temperature loop controls the flow of water to the absorber to permit the desulphurization.

While I have illustrated and described a preferred embodiment of my invention, it is understood that this is capable of modification, and I therefore do not wish to be limited to the precise details set forth, but desire to avail myself of such changes and alterations as fall within the purview of the following claims.

What I claim my invention is:

1. A control system for preventing downstream condensation in a spray absorber unit of the type having a dry spray scrubbing absorber, upstream and downstream combustion gas flow passages leading to and from the absorber, a sorbent source for supplying sorbent to the absorber, a dilution liquid source for supplying dilution liquid to the absorber, a contaminant control for increasing or decreasing the flow of sorbent to the absorber in response to the contaminant concentration in the gas downstream of the absorber, and a temperature control for increasing or decreasing the flow of dilution liquid to the absorber in response to the temperature of the gas downstream of the absorber, wherein the improvement comprises:
   a. A partial absorber shutdown control having a feed-forward sensor in the upstream gas flow passage monitoring the liquid vapor concentration of the gas upstream of the absorber, a shutoff valve in the dilution liquid supply, an operative connection between the sensor and the shutoff valve, the sensor including a switch actuated when the liquid vapor concentration exceeds a present value to transmit a signal to the valve through the operative connection and thereby close the valve and shut off the flow of dilution liquid to the absorber; and
   b. A complete absorber shutdown control including a complete shutdown sensor operable to detect upsets or failures affecting the combustion gas sufficiently severely that continued operation of the absorber would risk condensation formation downstream of the absorber, a shutoff valve in the sorbent source, an operative connection between the complete shutdown sensor and the valves in both sources, the complete shutdown sensor including a switch actuated in response to an upset or failure to transmit a signal to both valves through such operative connection to close the valves and shut off the flow of both sorbent and dilution liquid to the absorber.

2. A control system as in claim 1 wherein each valve includes means normally biasing the valve toward the closed position.

3. A control system as in claim 1 wherein the upstream combustion gas flow passage is defined by a boiler and the partial absorber shutdown control includes a feed-forward sensor monitoring rapid load reduction in the boiler, a feed-forward sensor monitoring boiler soot blowing, and a feed-forward sensor monitoring boiler tube leaks and operative connections between such sensors and the shutdown valve in the dilution liquid supply whereby triggering of any such sensors transmits a signal through the operative connection to such shutdown valve to shut off the flow of dilution liquid to the absorber.

4. A control system as in claim 1 wherein the combustion gas flow passages are defined by a boiler upstream of the absorber, a forced draft fan and a preheater, an induced draft fan downstream of the absorber and wherein the absorber includes an atomizer, the complete absorber shutdown control includes a number of complete shutdown sensors monitoring the performance of the elements upstream and downstream of the absorber and operative connections join such sensors and both shutoff valves whereby actuation of one of such sensors in response to an upset or a failure closes both valves.

5. A control system as in claim 1 wherein the complete absorber shutdown control includes a sensor in the gas flow passage downstream of the absorber and an operative connection between such sensor and both said valves to hold both said valves open unless the temperature of the gas downstream of the absorber exceeds a trigger level and wherein the operative connection for the partial shutdown control sensor joins the operative connection for the temperature sensor immediately adjacent the dilution liquid source valve so that such valve is closed only by the partial shutdown control sensor and the operative connection for the complete absorber shutdown control joins the operative connection for the temperature sensor adjacent the temperature sensor so that both valves are closed by the complete shutdown control sensor.

6. A control system as in claim 1 where the gas flow passage includes a filter downstream of the absorber and including a filter control having a low-temperature sensor in the gas flow passage upstream of the absorber and an operative connection between such sensor and both valves, said sensor emitting a signal to close both valves when the temperature of the gas flowing to the absorber is below a set level, a high-temperature sensor in the gas flow passage upstream of the absorber, an operative connection between such sensor and the dilution liquid source control valve, such sensor emitting a signal to limit full opening of such valve when the temperature of the gas flowing to the absorber exceeds a set level, the filter including a combustion gas bypass passage and an operative connection between both the high-and low-temperature sensors and the filter such that actuation of either sensor shifts the filter to connect the filter unit to the bypass passage.

7. The method of controlling a dry spray absorber of the type using sorbent and dilution liquid in a combustion gas decontamination process comprising the steps of:
   a. Supplying sorbent to the absorber in response to the concentration of a contaminant in the combustion gas during normal operation and partial shutdown
   b. Supplying dilution liquid to the absorber in response to the temperature of the combustion gas during normal operation;
   c. Partially shutting down the absorber by reducing the supply of dilution liquid to the absorber when the concentration of liquid vapor in the combustion gas upstream of the absorber exceeds a value otherwise likely to produce condensation downstream of the absorber; and d. Completely shutting down the absorber by stopping the supply of both dilution liquid and sorbent to the absorber in response to upsets or failures indicative of changes in the combustion gas otherwise likely to produce condensation downstream of the absorber.

8. The method of claim 7 including increasing the temperature of the combustion gas downstream of the absorber during partial and complete absorber shutdown.

9. The method of claim 8 including the step of stopping the supply of dilution liquid to the absorber during partial shutdown.

10. The method of claim 9 including the steps of stopping the supply of sorbent and dilution liquid to the absorber when the upstream combustion gas temperature falls below a minimum temperature while at the same time shifting a downstream filter to a bypass mode; and reducing the flow of dilution liquid to the absorber when the temperature of the combustion gas upstream of the absorber rises above a set value while at the same time shifting a downstream filter to a bypass mode.

11. The method of claim 7 including the step of maintaining a positive approach temperature during operation of the absorber.

* * * * *